United States Patent
Loesch et al.

(10) Patent No.: US 11,474,226 B2
(45) Date of Patent: Oct. 18, 2022

(54) METHOD AND APPARATUS FOR EMITTING ELECTROMAGNETIC RADIATION AND RECEIVING PARTIAL RADIATION REFLECTED BY THE OBJECTS

(71) Applicant: Robert Bosch GmbH, Stuttgart (DE)

(72) Inventors: Benedikt Loesch, Stuttgart (DE); Rolf Noethlings, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 252 days.

(21) Appl. No.: 17/009,396

(22) Filed: Sep. 1, 2020

(65) Prior Publication Data
US 2021/0096235 A1    Apr. 1, 2021

(30) Foreign Application Priority Data

Sep. 27, 2019  (DE) .......................... 102019214948.0
Oct. 1, 2019   (DE) .......................... 102019215107.8

(51) Int. Cl.
   *G01S 13/34*   (2006.01)
(52) U.S. Cl.
   CPC .......... *G01S 13/343* (2013.01); *G01S 13/346* (2013.01); *G01S 13/347* (2013.01); *G01S 13/348* (2013.01)
(58) Field of Classification Search
   CPC .... G01S 13/343; G01S 13/346; G01S 13/347; G01S 13/348; G01S 7/4026; G01S 7/4039
   See application file for complete search history.

(56) References Cited

U.S. PATENT DOCUMENTS

2021/0003689 A1*   1/2021   Kitsukawa .............. G01S 13/22

FOREIGN PATENT DOCUMENTS

DE       102012220879 A1     5/2014

* cited by examiner

*Primary Examiner* — Timothy A Brainard
(74) *Attorney, Agent, or Firm* — Norton Rose Fulbright US LLP; Gerard Messina

(57) ABSTRACT

An apparatus for emitting electromagnetic radiation and receiving partial radiation reflected by objects, and determines the instantaneous performance of its system detection. The apparatus includes a device for emitting a frequency-modulated transmit signal that has at least two signal sequences which have ramps, each succeeding one another in the frequency characteristic, with gaps in between, the signal sequences being interleaved with each other with a predetermined time offset so that in each case a first ramp of each of the signal sequences is output before a second ramp of one of the at least two signal sequences is output. The apparatus includes a mixer, an analog-to-digital converter, a transform device, and a device for detecting phase noise. The phase changes of the receive signals are compared over all two-dimensional spectra to a precalculated model, and the cause of the phase noise is ascertained with the aid of predetermined criteria.

14 Claims, 3 Drawing Sheets

METHOD AND APPARATUS FOR EMITTING ELECTROMAGNETIC RADIATION AND RECEIVING PARTIAL RADIATION REFLECTED BY THE OBJECTS

CROSS REFERENCE

The present application claims the benefit under 35 U.S.C. § 119 of German Patent Application No. DE 102019214948.0 filed on Sep. 27, 2019, and German Patent Application No. DE 102019215107.8 filed on Oct. 1, 2019, which both expressly incorporated herein by reference in their entireties.

BRIEF SUMMARY

The present invention relates to a method and an apparatus for emitting electromagnetic radiation and receiving partial radiation reflected by objects, that is able to determine the instantaneous performance of its system detection, in that a device is provided for emitting a frequency-modulated signal which has at least two signal sequences that have ramps each succeeding one another in the frequency characteristic with gaps in between, the at least two signal sequences being interleaved with each other with a predetermined time offset in such a way that in each case a first ramp of each of the at least two signal sequences is output before a second ramp of one of the at least two signal sequences is output, and the apparatus having a mixer for mixing the frequency-modulated transmit signal with the signal received by the at least one antenna, an analog-to-digital converter for digitizing the mixed product of the mixer, a device for transforming the digitized signal of each one of the at least two signal sequences into a two-dimensional spectrum, and a device for detecting phase noise in each of the two-dimensional spectra, a device being provided in which, in a first step, the phase changes of the receive signals are compared over all two-dimensional spectra to a precalculated model, and in a second step, the cause of the phase noise is determined with the aid of one or more predetermined criteria.

BACKGROUND INFORMATION

German Patent Application No. DE 10 2012 220 879 A1 describes a method for determining distances and relative speeds of several objects located simultaneously utilizing a FMCW radar, in which the frequency of a transmit signal in the form of periodically repeating ramps is modulated, the transmit signal is mixed with a received signal to form an intermediate frequency signal, and the change of the phase of the intermediate frequency signal from ramp to ramp is evaluated to determine the distance and/or the relative speed of the objects, the modulation pattern including at least two ramps that differ only by a fixed frequency offset and follow one another at a specific time interval, and an unambiguous approximate value being calculated for the object distance based on the phase difference of the intermediate frequency signals for these two ramps.

SUMMARY

In accordance with the present invention, and example method and apparatus are provided with which it is recognized whether an overly strong phase noise is present in certain regions of the spectrum, and consequently the measuring accuracy of the system is adversely affected in certain distance limits, or whether the system has only reduced detection capability because of a radome covering. According to the present invention, this may be achieved by the features described herein. Advantageous further developments and refinements are derived from the description herein.

According to the present invention, with the aid of the present invention, a strong phase noise is intended to be detected in the case of a radar sensor that utilizes a transmit signal made up of at least two signal sequences. Based on the receive signals which result from the ramp-shaped transmit signals, the distance and the relative speed of detected objects may be ascertained owing to a phase difference of the at least two ramp sequences. If one uses more than two signal sequences, for example, three, then it is also possible to ascertain a speed quality, thus, a measure for the probability that the ascertained value actually corresponds to the real distance and the real relative speed, and was not falsified by phase noise. Transferring the present invention from two signal sequences to three signal sequences represents no problem for one skilled in the art and lies within his/her normal capacities. Furthermore, within the framework of the exemplary embodiment described, two ramps sequences are represented, which, however, are to be regarded as an example. Thus, generally, time offsets between the individual ramp sequences are not equidistant, as shown, so that generally the starting moment of the first ramp of the second ramp sequence does not fall exactly on the end of the first ramp of the first ramp sequence. It is also possible that between the end of one ramp and the beginning of the following ramp, time gaps are provided which constitute a certain time delay of the transmit signal.

In addition, the time offsets of the individual ramp sequences may be so great that ambiguities come about in the determination of the relative speed of the objects, that is, the detections.

These ambiguities are resolved with the aid of the phase relationship of the individual sequences. In this context, it is necessary that during the object evaluation, several speed hypotheses are examined and pursued, and some of these speed hypotheses are abandoned again later in the process. Thus, the comparison to the model described herein is made up of several individual comparisons or correlations and subsequent maximum search over the various correlation values.

In accordance with example embodiments of the present invention, the instantaneous performance of the radar system advantageously includes the recognition of sensor blindness, particularly due to an absorptive radome covering, and/or the recognition of a weaker detection capability for weak targets, accompanied by simultaneous detection of strong targets. For the purpose of the present invention, the terms "weak targets" and "strong targets" are used for radar reflections on objects at which in the case of a "weak target", only a small amount of signal power is reflected back, and in the case of "strong targets", a great deal of signal power is reflected back to the receiving antenna. Depending on the amount of signal power reflected back, the phase noise may have stronger or weaker influence on the object detection. In the case of simultaneous strong detections and weak detections, specifically, the phase noise which is measured in the region of the weak detections is very much greater relative to the received power than the phase noise in the region of the detection of strong targets, since the phase noise can more likely be ignored there because of the higher received power.

In addition, it is advantageous if the precalculated model specifies anticipated phase differences for each point of the two-dimensional spectrum and compares the measured phase differences to the anticipated value. A separate two-dimensional spectrum is generated for each receive ramp of the transmitted ramp-shaped signal, e.g., utilizing a discreet, two-dimensional Fourier transform, object detections being ascertainable owing to phase differences. In this context, the precalculated model determines values for anticipated phase differences for each point of the two-dimensional spectrum, which are to be expected based on the known object detections. These anticipated phase differences, which were ascertained by modeling, are compared to the measured phase differences in order to determine phase noise and deduce a system degradation.

Furthermore, it is advantageous if the comparison of the phase difference of the measured values and the anticipated values is determined with the aid of a correlation. To that end, each anticipated phase value of the model in the two-dimensional spectrum is correlated with the corresponding point of the measured two-dimensional spectrum, and based on the level of the correlation values, it is concluded whether the measured values agree approximately with those calculated by modeling, or are too far apart.

Moreover, it is advantageous that phase noise is present if the value of the measured phase difference differs from the anticipated value by more than a permissible threshold value. In this case, it is particularly advantageous that the permissible threshold value may be determined for each point of the two-dimensional spectrum, and the threshold value is a function of the signal-to-noise ratio of each point in the two-dimensional spectrum. Accordingly, for each point of the two-dimensional spectrum, a separate threshold value may be defined, which is derived from the respective signal-to-noise ratio of each point of the two-dimensional spectrum.

Furthermore, it is advantageous that the phase differences are compared only in the regions of the two-dimensional spectra in which objects were detected. This is beneficial, since it is thus possible to save on computing power, because no evaluation must be carried out for regions in which no objects were detected and also for which no objects are to be expected in the present measuring cycle.

In addition, it is advantageous that the one or more criteria, based on which the cause of the phase noise is determined, is/are either the number of detections with poor speed quality, or the total number of detections, or the maximum signal-to-noise ratio of all valid targets, or the relative position of the detections having poor speed quality with respect to each other, as well as the position relative to the strongest valid target, or any combination of these possibilities. Moreover, one or more of these criteria may be evaluated during one measuring cycle, and the cause of the phase noise may thereupon be inferred, to thus conclude the reason for the system degradation. In this context, the number of detections with poor speed quality is the number of radar reflections on one or more objects, only the detections being used which exhibit a poor speed quality, thus have a probability that the measured speed value is not very accurate. Moreover, the total number of detections may be evaluated, thus, the number of radar reflection points on one or more objects. The criterion of the maximum signal-to-noise ratio of all valid targets is a further criterion, those objects being assessed as valid targets which may be assumed to be actually existing targets, since they satisfy certain quality criteria like, e.g., detection in a previous measuring cycle, the possession of a high speed quality or a sufficiently high backscattering power.

The further criterion of the relative position of the detections having poor speed quality with respect to each other as well as the position relative to the strongest valid target involves an evaluation of the detections, thus, the radar reflections at objects, which because of their weak received power, are very noisy, the detections in the two-dimensional spectrum being evaluated in terms of their distribution of the positions, it also being evaluated whether in the vicinity of these positions of the detections in the two-dimensional spectrum, a strong target is located which has a negative effect on weak targets.

Furthermore, it is advantageous that regions of the spectral range in which increased phase noise was determined are marked as unreliable for the recognition of absorptive blindness. In addition, it is advantageous that upon recognition of reduced detection performance, especially for weaker targets, in certain distance ranges of the sensor, these distance ranges are provided to downstream driver assistance functions. If spectral ranges in the two-dimensional spectrum are determined to be unreliable, then from their position in the two-dimensional spectrum, it is possible to deduce distance ranges of the sensor, and these distance ranges of the sensor are likewise marked as unreliable ranges. Such unreliable distance ranges may be made available to downstream driver assistance functions such as adaptive cruise controllers, automatic emergency braking functions, automatic emergency evasion functions or fusion functions in which objects which were detected by different sensors are fused, in order to increase the performance and reliability of the functions.

In addition, it is advantageous that detections with micro-Doppler effect are distinguished from genuine phase noise, by making a distinction based on the relative position of the detections having poor speed quality with respect to each other and with respect to the strongest valid target. Objects with micro-Doppler effect are objects whose object parts move with a speed relative to the overall speed of the object, e.g., rotating wheels on a moving car or rotating pedals on a bicycle, by which the breadth of the detection in the frequency spectrum broadens, but the cause lies not in the phase noise, but rather in the measured micro-Doppler effect.

Advantageously, it may also be provided that the two-dimensional spectrum is a speed-distance spectrum.

Moreover, in accordance with an example embodiment of the present invention, apparatus features are provided which are obtained analogously, in keeping with the method features described herein. For example, the method may be implemented in software or hardware or in a mixed form of software and hardware, e.g., in a control unit. The approach introduced here also provides a driver assistance function, e.g., a distance controller, an emergency braking function or an emergency evasion function, which is designed to carry out, control or implement the steps of a variant of the method presented here, in suitable devices.

The driver assistance function may be an electrical device having at least one arithmetic logic unit for processing signals or data, at least one memory unit for storing signals or data, and at least one interface and/or a communication interface for the read-in or output of data which are embedded in a communication protocol. For example, the arithmetic logic unit may be a signal processor, what is referred to as a system ASIC or a microcontroller for processing sensor signals and outputting data signals as a function of the sensor signals. The memory unit may be a flash memory, for example, an EPROM or a magnetic memory unit.

Of advantage is also a computer-program product or computer program having program code that may be stored on a machine-readable carrier or storage medium such as a semiconductor memory, a hard disk memory or an optical memory and is used to carry out, implement and/or control the steps of the method according to one of the specific embodiments described above, especially when the program product or program is executed on a computer, a programmable control unit or a similar device.

BRIEF DESCRIPTION OF THE DRAWINGS

Below, exemplary embodiments of the present invention are explained with reference to the figures.

DETAILED DESCRIPTION OF EXAMPLE EMBODIMENTS

Figure 1:
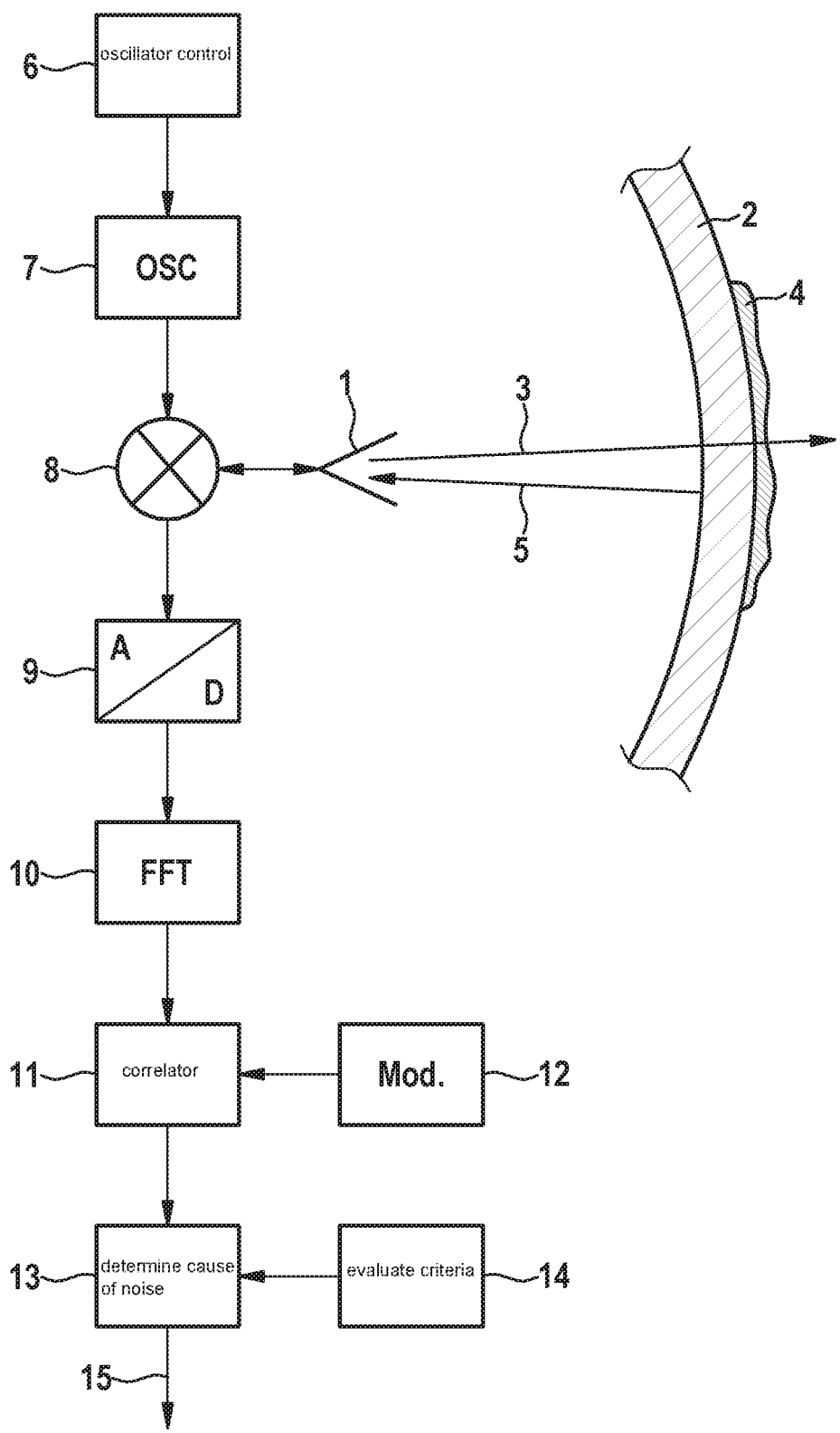
FIG. 1 shows a schematic block diagram for elucidating an example embodiment of an apparatus of the present invention and example embodiment of the method of the present invention, respectively.

FIG. 1 shows an exemplary block diagram of an apparatus according to the present invention and the method according to the invention for emitting electromagnetic radiation and receiving partial radiation reflected by the objects. An antenna 1 can be seen, which in the example shown, is operated as a monostatic antenna, thus, as an antenna which is able both to transmit and to receive. Alternatively, it is also possible to implement the present invention in a bistatic system, by providing separate antennas for transmitting and for receiving the electromagnetic radiation.

Figure 2:
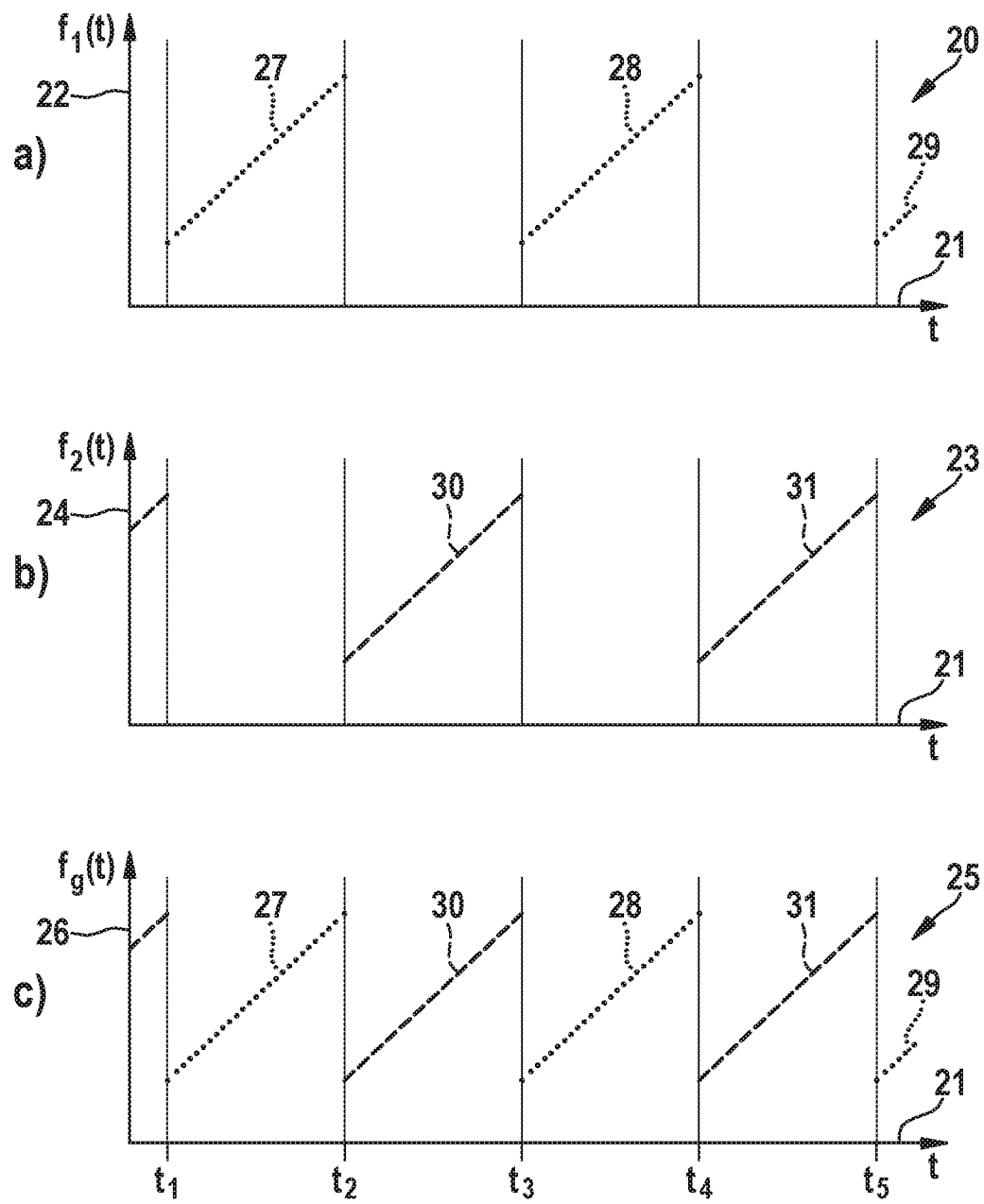
FIG. 2 shows a three-part diagram that illustrates, by way of example, the frequency-modulated transmit signal made up of at least two signal sequences.

For operation, an oscillator 7 is operated in such a way that signals are provided in a carrier frequency of the apparatus. To that end, it is possible for signals from an oscillator control 6 to be supplied to oscillator 7. For example, this oscillator control 6 is able to produce the generated frequency as shown according to FIG. 2. Since according to the present invention, the phase difference between ramps of different signal sequences is evaluated in order to determine the distance and the relative speed of detected objects, it is necessary that oscillator control 6 output suitable control signals to oscillator 7 or oscillators 7, so that a transmit signal according to FIG. 2 is made available. The transmit signal generated with the aid of oscillator 7 is conducted to mixer 8, which also serves as transmit/receive switch and passes on the transmit signal to antenna 1.

Antenna 1 radiates electromagnetic transmit signal 3, which in normal operation, penetrates radome 2 and has the task of detecting objects in the sensor surround field. Objects in the sensor surround field reflect transmit radiation 3 back to the transmitter, which is received as received radiation 5 by transmit and receive antenna 1, after it has once again transited radome 2. Receive signals, which were received by antenna 1, are supplied to mixer 8, in which they are mixed with the transmit signals and demodulated. Mixer 8 generates an intermediate frequency signal, which is output to a downstream analog-to-digital converter 9.

After the intermediate frequency signal has been digitized in analog-to-digital converter 9, the signal is forwarded to a device 10 and subjected to a Fourier transform, particularly a discrete and two-dimensional Fourier transform, whereupon device 10 outputs a spectrum or a plurality of two-dimensional spectra, which are further processed. In so doing, a separate two-dimensional spectrum is generated for each signal sequence 20, 23.

For example, radome 2 may be a covering of the apparatus according to the present invention, which protects the components from weather conditions and mechanical influences. Moreover, it is also possible that this radome 2 is lenticular and thus also exhibits additionally focusing properties for emitted and received electromagnetic radiation 3, 5.

If the vehicle becomes dirty during operation or is operated in rain or snow, then it is possible that an absorptive coating 4 or an absorbent coating 4 will adhere to sensor radome 2, which absorbs both the emitted transmit radiation and the receive radiation to be received and turns it within the coating into lost heat. Since reflection signals are hardly generated by absorptive coatings 4, it is very difficult to recognize absorptive coatings 4 on radome surface 2, so that during further operation, the sensor may go blind without it being noticed. It is likewise possible that, depending on the constellation of the detected objects, the so-called weak objects, which are detected in the spectrum in the proximity of so-called strong objects, are very noisy, and this phase noise makes it difficult to precisely determine the distance and relative speed of the objects. In this context, strong objects are reflecting objects which reflect back a high received power, and weak objects are reflecting objects which reflect only a little received power back to the receiving antenna. This means that the apparatus receives no or hardly any receive signals which are indicative of objects, even though objects are present in the surround field and the sensor is functioning as intended. To nevertheless be able to detect absorptive radome coatings 4 or objects obscured by phase noise, the two-dimensional speed-distance spectra output by device 10 are subjected to a further evaluation. To that end, in a first step 11, a correlation is carried out. Data of a precalculated model are supplied to correlator 11 for the correlation in this correlator 11. For each point of the distance-speed spectrum, this two-dimensional precalculated model ascertains values for a phase noise to be anticipated, as are to be expected based on the instantaneously detected objects and the signal-to-noise ratios at the individual positions of the two-dimensional spectra. The speed quality is also taken into account in this precalculated model, the speed quality indicating a probability that the measured phase difference agrees with that from the model and therefore corresponds to a real target. These values precalculated according to noise model 12 are correlated by correlator 11 with the measured, two-dimensional spectra, and correlation values are formed which indicate whether the measured phase noise agrees with the anticipated phase noise. These correlation values are forwarded to a further device for determining the cause of the noise 13, in which for the regions in which an unexpectedly high phase noise was ascertained, its cause is determined with the aid of various criteria. For this purpose, various criteria are evaluated in device 14, thus, for example, the number of detections with poor speed quality or the total number of detections in the present or previous measuring cycle. Further criteria 14 for determining the cause of the phase noise may be the maximum signal-to-noise ratio of all valid targets, thus, all objects which were detected and verified as real targets in preceding measuring cycles. A further criterion 14 for determining the cause of the phase noise is the position of the detections with poor speed quality in the two-dimensional spectrum, their position being evaluated with respect to each other, and the position of the detections with poor speed quality being analyzed relative to the strongest valid target. In this context, the distance of the detections in the spectrum may be evaluated in the distance dimension or in the relative-speed dimension or in a combination of both. If criteria 14 for the cause of the phase noise were determined in device 13, then certain distance ranges may be identified as unreliable measuring ranges and the evaluation of object detections in these ranges may be prevented, for example, or take place using other methods. Thus, the device for ascertaining the cause of noise may provide output signals 15 which are made available to downstream driver-assistance functions such as distance controls, adaptive cruise controls, automatic emergency-braking functions, automatic evasion functions or other safety and assistance functions or for a fusion of objects which were detected by various sensors. Consequently, it is possible to appropriately assess objects in ranges whose measured detections were very adversely affected by the phase noise.

FIG. 2 shows an exemplary transmit sequence of the transmit signal according to the present invention. Thus, diagram FIG. 2a shows a first signal sequence 20 of the at least two signal sequences. A time axis 21 can be seen, on which a frequency axis 22 of the first ramp is plotted. By way of example, points in time t1, t2 to t5, which are shown equidistant from each other, are plotted on the time axis. However, within the scope of the present invention, these points in time do not have to be equidistant, nor must these regions directly follow one another, so that upon the transition from one ramp to the next, dead times may also be present, in which no transmit signal is emitted. A first ramp 27 may be seen, which has a linearly rising frequency f1(t). In the following time period between t2 and t3, no first ramp signal takes place. In the subsequent interval between t3 and t4, ramp 28 is generated in linear fashion, which was represented as identical to ramp 27. According to the present invention, it is possible for ramp 28 to have a different gradient, a different length or different framework values. In FIG. 2b plotted below that, a second ramp sequence 23 of the at least two signal sequences is plotted. Time axis 21 is depicted again, which shows points in time t1 to t5. Over time axis 21, frequency axis 24 of the second ramp is plotted as signal f2(t). In the time interval between t1 and t2, during which first ramp 27 generates a signal, no signal is generated by second signal sequence 23. In the next following period between t2 and t3, during which first transmit sequence 20 outputs no signal, a linearly rising frequency ramp 30 is generated. This frequency ramp 30 may have the same start and stop frequency f2 of (t) as ramp 27 or 28 in FIG. 2a, however, it is also possible to use other frequency values for this.

Diagram 25 of FIG. 2c shows joint signal 25 of the at least two signal sequences 20 and 23 of FIGS. 2a and 2b, in which first ramp 27, 28, 29 and second ramp 30, 31 were combined with each other. As already described, first ramp 27, 28, 29 and second ramp 30, 31 do not have to have equidistant points in time t1 to t5, nor do they have to have the same starting frequencies and stop frequencies, so that the two ramps may also differ considerably from each other. In using two sequences, the objects as well as their distance and relative speed are ascertained based on a change of the phase difference between two receive signals. In this case, ascertainment of a speed quality is not possible. If, instead of the two transmit sequences 20, 23 shown, an additional third transmit sequence is used, then the system of the phase difference becomes overdetermined and it is possible to calculate a speed quality, thus, a probability which indicates how likely it is that the measured value agrees with the real value.

Figure 3:
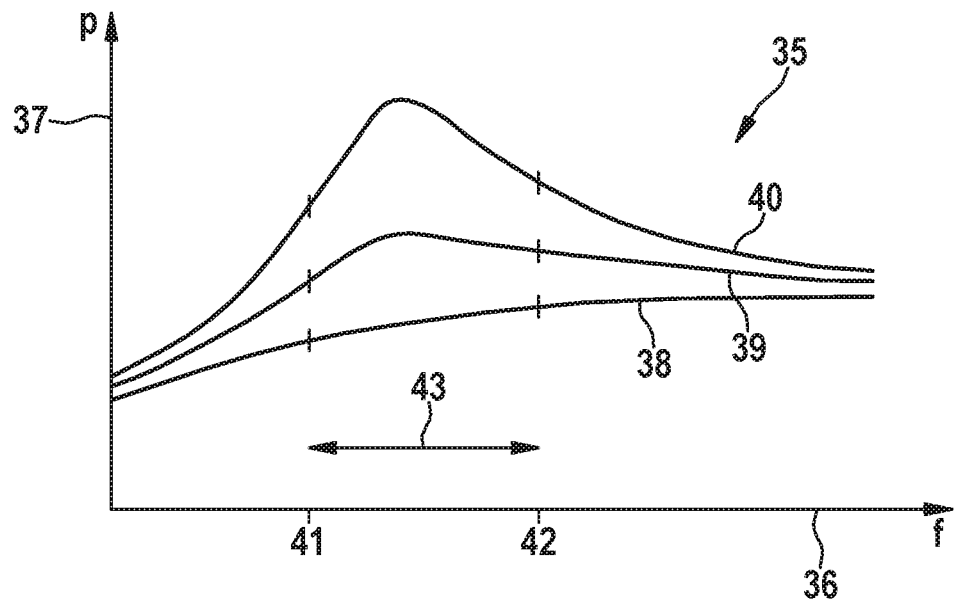
FIG. 3 shows an exemplary representation of a noise spectrum.

FIG. 3 depicts a frequency spectrum 35 of the phase noise. This frequency spectrum shows a frequency axis 36 on the abscissa, over which a noise power P is plotted with the aid of ordinate axis 37. In this exemplary diagram, a first curve 38 is shown, which represents the thermal noise without phase noise. Above it, a further curve 39 is plotted, which represents the estimated noise level. In addition, a third curve 40 is plotted, which takes a course above the two curves 38 and 39. This further curve 40 represents the maximum noise occurring, made up of phase noise and thermal noise. This curve 40 may be stored permanently in the system and depends on the apparatus used. For example, allowing for an additional tolerance, this curve 40 may be used as a decision threshold as to whether the frequency range analyzed at the moment is an unreliable range or may be assessed as reliable. In this context, the difference between the curve of measured noise 39 and the curve of estimated maximum noise 40 may be used as decision criterion as to whether the phase noise is very pronounced and therefore a region 43 is present. If the phase noise is very highly pronounced, one may infer that the measured values are unreliable. This region was marked by lower cutoff frequency 41 and upper cutoff frequency 42, and spans an unreliable spectral region 43.

Figure 4:
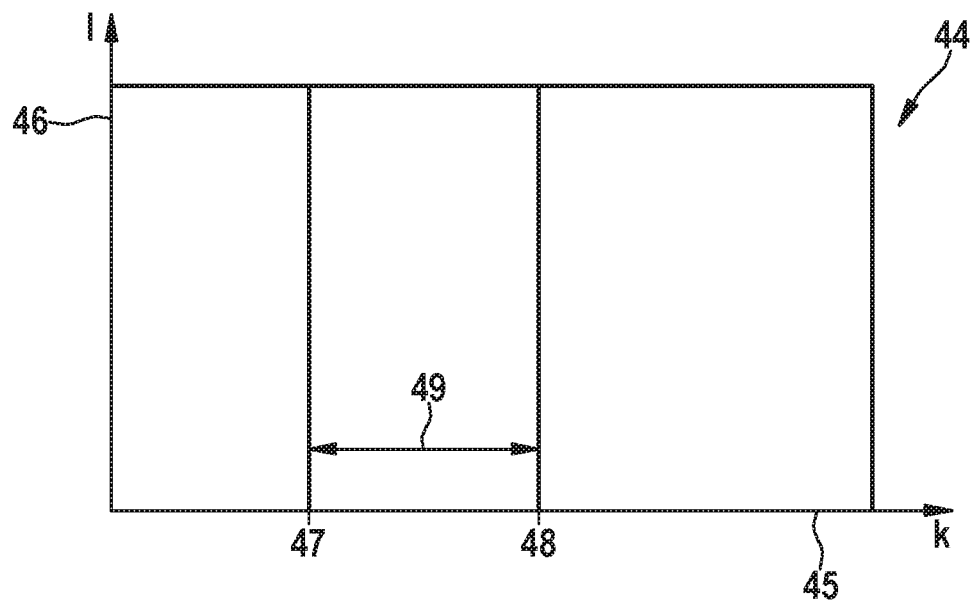
FIG. 4 shows an exemplary representation of a two-dimensional spectrum with illustration of an unreliable region in the two-dimensional spectrum.

In the diagram of FIG. 4, a two-dimensional speed-distance spectrum 44 was plotted, which shows discrete distance values k, also known as frequency bins, in the horizontal dimension, and discrete relative-speed values, referred to as relative-speed bins, in the vertical dimension I. Such a two-dimensional speed-distance spectrum 44 is generated for each of the two transmit sequences 20, 23 and evaluated according to the present invention. From the region ascertained in FIG. 3, it is possible to infer a region with reduced detection performance. The reduced detection performance may be an unreliable detection and/or may also be due to a poor detection.

In the case of an unreliable detection, the measured values are mixed with strong noise, so that the detections exhibit increased uncertainty, and therefore the probability of a correct detection as against a unreliable detection is decreased.

In the case of the poor detection, only a little electromagnetic power is received as receive signal 5, which may be due to a low reflective property of the reflection point on the object or may be explained by a strong damping on the signal path. The received power may even be so low that it falls below the estimated noise level. In this case, the reflection point of the object is no longer able to be detected.

In both cases, the unreliable region may be bounded by distance values or distance bins, which describe the unreliability region in distance direction k. Moreover, a lower limit distance of unreliable distance region 47 as well as an upper limit distance 48 of unreliable distance region 49 may be ascertained from unreliability region 43. Thus, it is possible that output signals 15 pass on this unreliability region 49, and object detections in this unreliability region 49 are evaluated only with wariness in further driver assistance functions or vehicle safety functions, since these object detections are fraught with great measuring uncertainty, or weak targets can only be detected poorly there.

What is claimed is:

1. A method for determining an instantaneous performance of a radar system that includes an apparatus for emitting electromagnetic radiation and receiving partial radiation reflected by objects having a frequency-modulated transmit signal, which has at least two signal sequences, that have ramps, each of the ramps succeeding one another in a frequency characteristic, with gaps in between, the at least two signal sequences being interleaved with each other with a predetermined time offset in such a way that in each case a first ramp of each of the at least two signal sequences is output before a second ramp of one of the at least two signal sequences is output, the apparatus further including a mixer mixing a frequency-modulated transmit signal with a signal received by at least one antenna of the radar system, a mixed product of the mixer being converted from analog to digital, a digitized signal of each of the at least two signal sequences being transformed into a two-dimensional spectrum, and phase noise being detected in each of the two-dimensional spectra, the method comprising:

in a first step, comparing phase changes of received reflected signals over all two-dimensional spectra to a precalculated model; and in a second step, ascertaining a cause of the phase noise using one or more predetermined criteria.

2. The method as recited in claim 1, wherein the instantaneous performance of the radar system includes: (i) recognition of sensor blindness due to an absorptive radome coating, and/or (ii) recognition of weaker detection capability for weak targets, accompanied by simultaneous detection of strong targets.

3. The method as recited in claim 2, wherein upon recognition of reduced detection performance for weaker targets in certain distance regions of the sensor, the certain distance regions are provided to downstream driver assistance functions.

4. The method as recited claim 1, wherein the precalculated model specifies anticipated phase differences for each point of the two-dimensional spectrum and compares measured phase differences to the anticipated differences.

5. The method as recited in claim 4, wherein the comparison of the measured phase differences and the anticipated differences is determined using a correlation.

6. The method as recited in claim 4, wherein phase noise is present when a value of the measured phase differences differs from an anticipated value of the anticipated differences by more than a permissible threshold value.

7. The method as recited in claim 6, wherein the permissible threshold value is determined for each point of the two-dimensional spectrum, and the threshold permissible threshold value is a function of a signal-to-noise ratio of each point in the two-dimensional spectrum.

8. The method as recited in claim 4, wherein the phase differences are compared only in regions of the two-dimensional spectra in which objects are detected.

9. The method as recited in claim 1, wherein the one or more criteria, based on which the cause of the phase noise is determined, includes, during one measuring cycle:

a number of detections with poor speed quality, and/or
a total number of detections, and/or
a maximum signal-to-noise ratio of all valid targets, and/or
a relative position of the detections with poor speed quality with respect to each other as well as a position relative to the strongest valid target.

10. The method as recited in claim 1, wherein regions of the two-dimensional spectra in which increased phase noise is determined are marked as unreliable for recognition of absorptive blindness.

11. The method as recited in claim 1, wherein detections with micro-Doppler effect are distinguished from "real" phase noise based on a relative position of the detections having poor speed quality with respect to each other and with respect to a strongest valid target.

12. The method as recited in claim 1, wherein the two-dimensional spectrum is a speed-distance spectrum.

13. A non-transitory machine-readable storage medium on which is stored a computer program for determining an instantaneous performance of a radar system that includes an apparatus for emitting electromagnetic radiation and receiving partial radiation reflected by objects having a frequency-modulated transmit signal, which has at least two signal sequences, that have ramps, each of the ramps succeeding one another in a frequency characteristic, with gaps in between, the at least two signal sequences being interleaved with each other with a predetermined time offset in such a way that in each case a first ramp of each of the at least two signal sequences is output before a second ramp of one of the at least two signal sequences is output, the apparatus further including a mixer mixing a frequency-modulated transmit signal with a signal received by at least one antenna of the radar system, a mixed product of the mixer being converted from analog to digital, a digitized signal of each of the at least two signal sequences being transformed into a two-dimensional spectrum, and phase noise being detected in each of the two-dimensional spectra, the computer program, when executed by a computer, causing the computer to perform:

in a first step, comparing phase changes of received signals over all two-dimensional spectra to a precalculated model; and in a second step, ascertaining a cause of the phase noise using one or more predetermined criteria.

14. An apparatus for emitting electromagnetic radiation and receiving partial radiation reflected by objects, which is able to determine the instantaneous performance of its system detection, comprising:

a device configured to emit a frequency-modulated transmit signal which has at least two signal sequences, that have ramps, each succeeding one another in the frequency characteristic, with gaps in between, the at least two signal sequences being interleaved with each other with a predetermined time offset in such a way that in each case a first ramp of each of the at least two signal sequences is output before a second ramp of one of the at least two signal sequences is output;

a mixer configured to mix the frequency-modulated transmit signal with a signal received by at least one antenna of a radar system;

an analog-to-digital converter configured to digitize a mixed product of the mixer;

a device configured to transform the digitized signal of each one of the at least two signal sequences into a two-dimensional spectrum;

a device configured to detect phase noise in each of the two-dimensional spectra; and a device configured to, in a first step, compare phase changes of received reflected signals over all two-dimensional spectra to a precalculated model, and in a second step, ascertain a cause of phase noise using one or more predetermined criteria.

* * * * *